United States Patent [19]
Nakamura

[11] Patent Number: 5,461,628
[45] Date of Patent: Oct. 24, 1995

[54] NETWORK SYSTEM CAPABLE OF NETWORK ELEMENTS WITH DECREASING LOAD OF A MONITORING DEVICE

[75] Inventor: Shinya Nakamura, Tokyo, Japan

[73] Assignee: NEC Corporation, Tokyo, Japan

[21] Appl. No.: 260,814

[22] Filed: Jun. 16, 1994

[30] Foreign Application Priority Data

Jun. 18, 1993 [JP] Japan .................................. 5-147604

[51] Int. Cl.$^6$ ..................................................... G06F 11/00
[52] U.S. Cl. ........................ 371/20.1; 371/68.2; 370/16.1; 395/183.15; 395/183.19; 395/185.1
[58] Field of Search .................................... 371/20.1, 8.2, 371/15.1, 68.2; 123/198 D

[56] References Cited

U.S. PATENT DOCUMENTS

| | | | |
|---|---|---|---|
| 4,509,117 | 4/1985 | Korowitz | 364/200 |
| 4,566,097 | 1/1986 | Bederman | 370/89 |
| 5,101,408 | 3/1992 | Kitsuregawa et al. | 371/16.5 |
| 5,315,972 | 5/1994 | Judy et al. | 123/198 |

*Primary Examiner*—Hoa T. Nguyen
*Attorney, Agent, or Firm*—Sughrue, Mion, Zinn, Macpeak & Seas

[57] ABSTRACT

A network system comprises a plurality of network elements connected to one another and a monitoring device for monitoring the network elements. Each of the network elements produces first through N-th fault signals when first through N-th faults occur in each of the network elements, where N represents a positive integer which is greater than one. In each of the network elements, a classifying circuit classifies the first through the N-th fault signals in accordance with a predetermined fault level to produce at least one classified signal. A selecting circuit is supplied with the first through the N-th fault signals as a fault message signal and the classified signal and selects one of the fault message signal and the classified signal to produce a selected signal. The selected signal is delivered as a monitoring signal to the monitoring device.

3 Claims, 2 Drawing Sheets

NETWORK SYSTEM CAPABLE OF NETWORK ELEMENTS WITH DECREASING LOAD OF A MONITORING DEVICE

BACKGROUND OF THE INVENTION

This invention relates to a network system having a plurality of network elements and a monitoring device for monitoring the network elements.

In general, a network system comprises a plurality of network elements connected to one another and a monitoring device connected to each of the network elements. Each of the network elements comprises a plurality of network units which may carry out a network process in cooperation with one another. Inasmuch as various faults may occur in each of network units, each of the network elements comprises a fault detecting circuit for detecting the faults of each network unit to produce fault signals different from one another. Each of the fault signal is representative of a detail message of the fault.

More particularly, the fault detecting circuit may produce first through N-th fault signals when first through N-th faults occur in a specific one of network elements, respectively, where N represents a positive integer which is greater than one. The first through the N-th fault signals are supplied from the specific network element to the monitoring device. The monitoring device monitors the specific network element on the basis of the first through the N-th fault signals.

The first through the N-th fault signals are representative of first through N-th fault messages, respectively. For example, the first through the N-th fault messages are defined by "Operations Technology Generic Requirements (OTGR): Operations Application Messages-Network Maintenance: Network Element and Transport Surveillance Messages" which is issued on 4 Dec., 1990.

In addition, each of the network elements is monitored or supervised by the monitoring device as described above. For example, supervision of the network elements is disclosed in "Framework Generic Requirements for Element Management Layer (EML) Functionality and Architecture" which is issued on 1 Aug., 1992.

As described above, the specific network element produces the first through the N-th fault signals when the first through the N-th faults occur in the specific network element. Therefore, the number of the fault signals increases as the positive integer N becomes greater and greater. When a large amount of faults occur in the specific network element, it is difficult for the monitoring device to supervise the specific network element. Namely, the load of the monitoring device increases over the capacity of the monitoring device.

SUMMARY OF THE INVENTION

It is an object of this invention to provide a network system capable of decreasing the load for a monitoring device.

Other objects of this invention will become clear as the description proceeds.

According to a first aspect of this invention, there is provided a network system comprising a plurality of network elements connected to one another and a monitoring device connected to each of the network elements for monitoring the network elements. Each of the network elements produces first through N-th fault signals when first through N-th faults occur in each of the network elements, where N represents a positive integer which is greater than one. Each of the network elements comprises classifying means supplied with the first through the N-th fault signals for classifying the first through the N-th fault signals in accordance with a predetermined fault level to produce at least one classified signal and delivering means supplied with the at least one classified signal for delivering the at least one classified signal as a monitoring signal to the monitoring device.

According to a second aspect of this invention, there is provided a network system comprising a plurality of network elements connected to one another and a monitoring device connected to each of the network elements for monitoring the network elements. Each of the network elements produces first through N-th fault signals when first through N-th faults occur in each of the network elements, where N represents a positive integer which is greater than one. Each of the network elements comprises classifying means supplied with the first through the N-th fault signals for classifying the first through the N-th fault signals in accordance with a predetermined fault level to produce at least one classified signal, selecting means supplied with the first through the N-th fault signals as a fault message signal and the at least one classified signal for selecting one of the fault message signal and the at least one classified signal to produce a selected signal, and delivering means supplied with the selected signal for delivering the selected signal as a monitoring signal to the monitoring device.

DESCRIPTION OF THE PREFERRED EMBODIMENT

Figure 1:
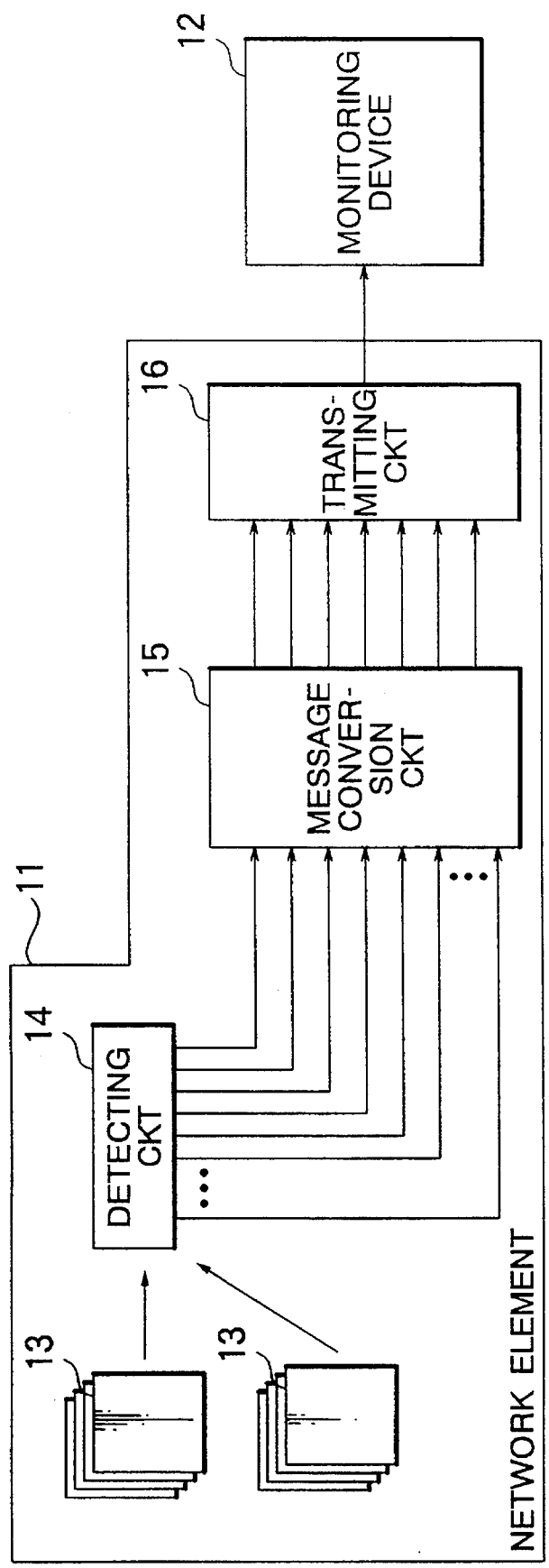
FIG. 1 is a block diagram of a conventional network system.

Referring to FIG. 1, description will be made as regards a conventional network system for a better understanding of this invention. The network system comprises a plurality of network elements although only one network element 11 is illustrated in FIG. 1. The network elements may be connected to one another and to a monitoring system or device 12 although only the network element 11 is connected to the monitoring device 12 in FIG. 1.

The network element 11 comprises a plurality of network units 13 which may carry out a network process in cooperation with one another. In the network units 13, various faults may occur. More specifically, first through N-th faults may occur in the network units, where N represents a positive integer which is greater than one. The first through the N-th faults are different from one another.

The network element 11 further comprises a fault detecting circuit 14 for detecting the first through the N-th faults to produce first through N-th fault signals, respectively. The first through the N-th fault signals are representative of detail messages of the first through the N-th faults, respectively.

The first through the N-th fault signals are supplied from the fault detecting circuit 14 to a message conversion circuit 15 to be protocol converted into first through N-th message signals. The first through the N-th message signals are supplied to a transmitting circuit 16. The transmitting circuit 16 collectively transmits the first through the N-th message signals as a monitoring signal to the monitoring device 12. The monitoring device 12 monitors or supervises the network element 11 on the basis of the monitoring signal.

As readily understood from the above description, the network element 11 produces the first through the N-th fault signals when the first through the N-th faults occur in the network element 11. Therefore, the number of the fault signals increases as the positive integer N becomes greater and greater. It is difficult for the monitoring device 12 to monitor the network element 11 when a large amount of faults occur in the network element 11. Namely, the load of the monitoring device 12 increases over the capacity of the monitoring device 11.

Figure 2:
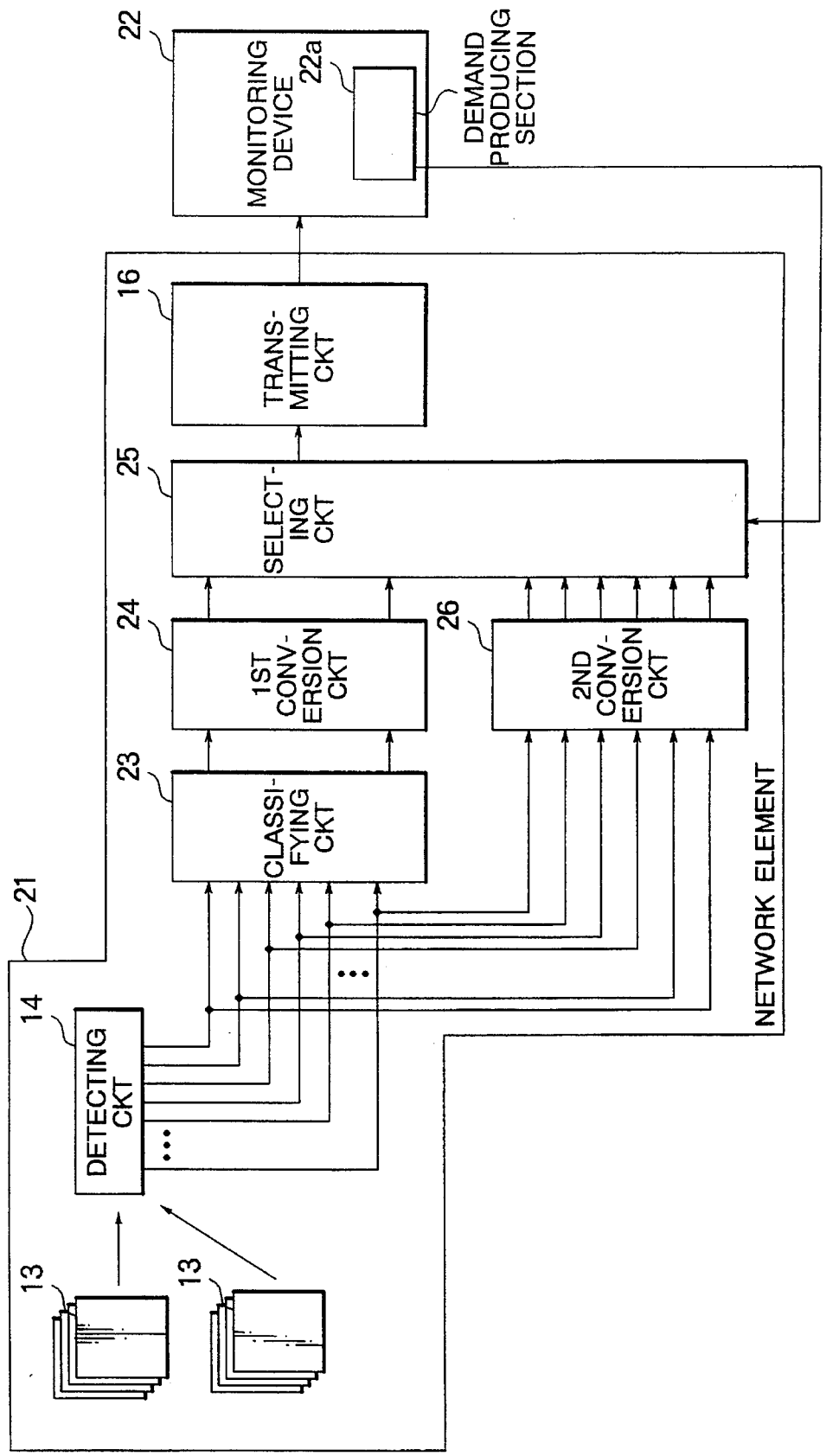
FIG. 2 is a block diagram of a network system of a preferred embodiment according to this invention.

Referring to FIG. 2, description will proceed to a network system of a preferred embodiment according to this invention. The illustrated network system comprises a network element and a monitoring device which are different in structure from the network element 11 and the monitoring device 12 illustrated in FIG. 1, respectively. Therefore, the network element and the monitoring device illustrated in FIG. 1 are designated afresh by reference numerals 21 and 22, respectively.

The network element 21 comprises similar parts which are designated by like reference numerals. The network element 21 further comprises classifying circuit 23 connected to the fault detecting circuit 14. The classifying circuit 23 has a predetermined fault level. More particularly, the predetermined fault level is classified into first through M-th fault sublevels or ranks each of which defines a fault degree representative of significance of the fault, where M represents a positive number which is greater than one. The positive number M is less than the positive integer N.

Now, it will be assumed that the positive integer N is equal to seven and that the positive number M is equal to two. The classifying circuit 23 classify the first through the seventh fault signals in accordance with the first and the second fault sublevels to produce at least one classified signal. More specifically, the classifying circuit 23 judges whether or not the fault degree of each of the first through the seventh fault signals belongs to either one of the first and the second fault sublevels.

It will be assumed that each of the first, the second, the third, and the fifth fault signals has a first fault degree corresponding to the first fault sublevel and that each of the sixth and the seventh fault signals has a second fault degree corresponding to the second fault sublevel. Under the circumstances, the classifying circuit 23 produces first and second classified signals which will be called major and minor alarms, respectively. The first and the second classified signals are representative of the first and the second fault degrees. The first and the second classified signals are delivered from the classifying circuit 23 to a first conversion circuit 24 to be protocol converted into first and second rank signals. The first and the second rank signals are supplied as a rank signal sequence from the first conversion circuit 24 to a selecting circuit 25.

On the other hand, the first through the seventh fault signals are supplied to a second conversion circuit 26 to be protocol converted into the first through the seventh message signals. The first through the seventh message signals are supplied as a message signal sequence to the selecting circuit 25.

The selecting circuit 25 selects the rank signal sequence from the rank and message signal sequences to deliver the rank signal sequence as a selected signal to the transmitting circuit 16. The transmitting circuit 16 transmits the rank signal sequence as a first monitoring signal to the monitoring device 22.

The monitoring device 22 comprises a demand producing section 22a. Supplied with the first monitoring signal, the monitoring device 22 judges whether or not it is necessary to exactly monitor the network element 21. When it is necessary to exactly monitor the network element 21, the monitoring device 22 puts the demand producing section 22a into operation. The demand producing section 22a produces a demand signal which is supplied to the selecting circuit 25.

Responsive to the demand signal, the selecting circuit 25 selects the message signal sequence to deliver the message signal sequence as the selected signal to the transmitting circuit 16. The transmitting circuit 16 transmits the message signal sequence as a second monitoring signal to the monitoring device 22. It is possible for the monitoring device 22 to exactly monitor the network element 11.

As readily understood from the above description, the rank signal sequence is at first supplied to the monitoring device 22. The monitoring device 22 decides whether or not it is necessary to obtain the message signal sequence on the basis of the rank signal sequence. Namely, the monitoring device 22 decides whether or not it is possible to obtain the message signal sequence according to need. Therefore, it is possible to decrease the load of monitoring device 22 even though the positive integer N becomes great.

What is claimed is:

1. A network system comprising:

a plurality of network elements connected to one another; and a monitoring device connected to each of said network elements for monitoring said network elements, wherein each of said network elements comprises:

a plurality of network units collectively producing first through N-th fault signals when first through N-th faults occur in any of said network elements, where N represents a positive integer which is greater than one, and where said first through said N-th fault signals is defined as a fault message signal sequence;

classifying means supplied with said first through said N-th fault signals for classifying said first through said N-th fault signals in accordance with a predetermined fault level to produce at least one classified signal;

selecting means, being supplied with said fault message signal sequence and said at least one classified signal for selecting one of said fault message signal sequence and said at least one classified signal to produce a selected signal; and delivering means supplied with said selected signal for delivering said selected signal as a monitoring signal to said monitoring device.

2. A network system as claimed in claim 1, wherein:

said predetermined fault level having a plurality of fault sublevels each of which defines a fault degree representative of significance of said fault signal;

said classifying means detecting the fault degree of each of said first through said N-th fault signals on the basis of a fault sublevel to classify said first through said N-th fault signals to thereby produce said at least one classified signal.

3. A network system as claimed in claim 1, a specific one of said network elements supplying said monitoring device with said at least one classified signal as a specific monitoring signal, wherein:

said monitoring device comprises a demand producing means for producing a demand signal in accordance with said at least one classified signal to supply said demand signal to the selecting means of said specific network element;

said selecting means, in response to said demand signal, selecting said fault message signal sequence as said selected signal in said specific network element.

* * * * *